(No Model.)　　　　　F. H. RICHARDS.　　8 Sheets—Sheet 1.
WEIGHING MACHINE.
No. 578,160.　　　　　　　　Patented Mar. 2, 1897.
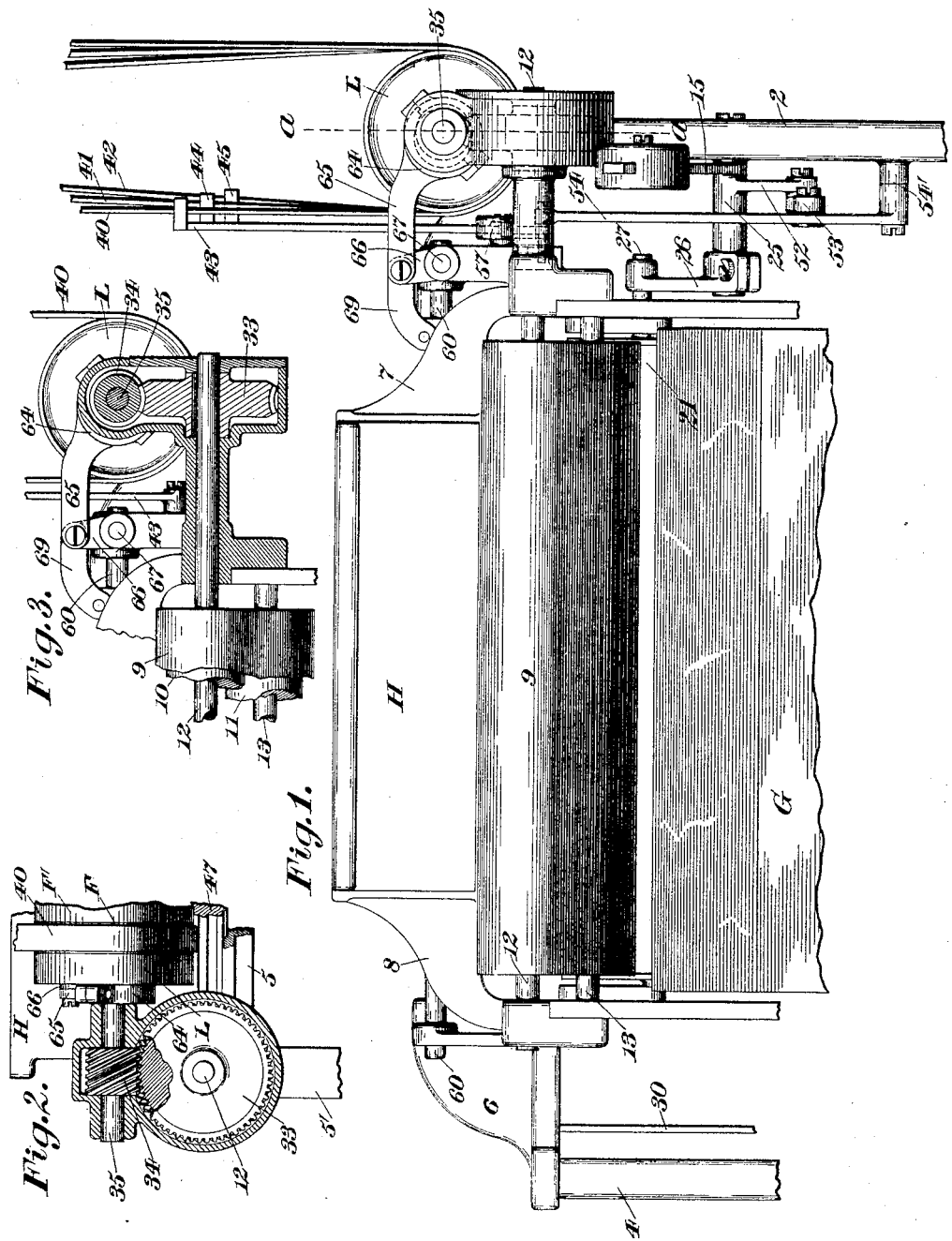
Witnesses:
Chas. D. King.
Fred. J. Dole.
Inventor:
F. H. Richards.

(No Model.)  F. H. RICHARDS.  8 Sheets—Sheet 2.
WEIGHING MACHINE.

No. 578,160.  Patented Mar. 2, 1897.

Witnesses:
Chas. D. King.
Fred J. Dole.

Inventor:
F. H. Richards.

(No Model.)

F. H. RICHARDS.
WEIGHING MACHINE.

No. 578,160. Patented Mar. 2, 1897.

8 Sheets—Sheet 4.

Witnesses:
Chas. D. King.
Fred. J. Dole.

Inventor:
F. H. Richards.

(No Model.)
8 Sheets—Sheet 5.

F. H. RICHARDS.
WEIGHING MACHINE.

No. 578,160.

Patented Mar. 2, 1897.

Witnesses:
Chas. D. King.
Fred. J. Dole.

Inventor:
F. H. Richards.

(No Model.) 8 Sheets—Sheet 6.
F. H. RICHARDS.
WEIGHING MACHINE.
No. 578,160. Patented Mar. 2, 1897.
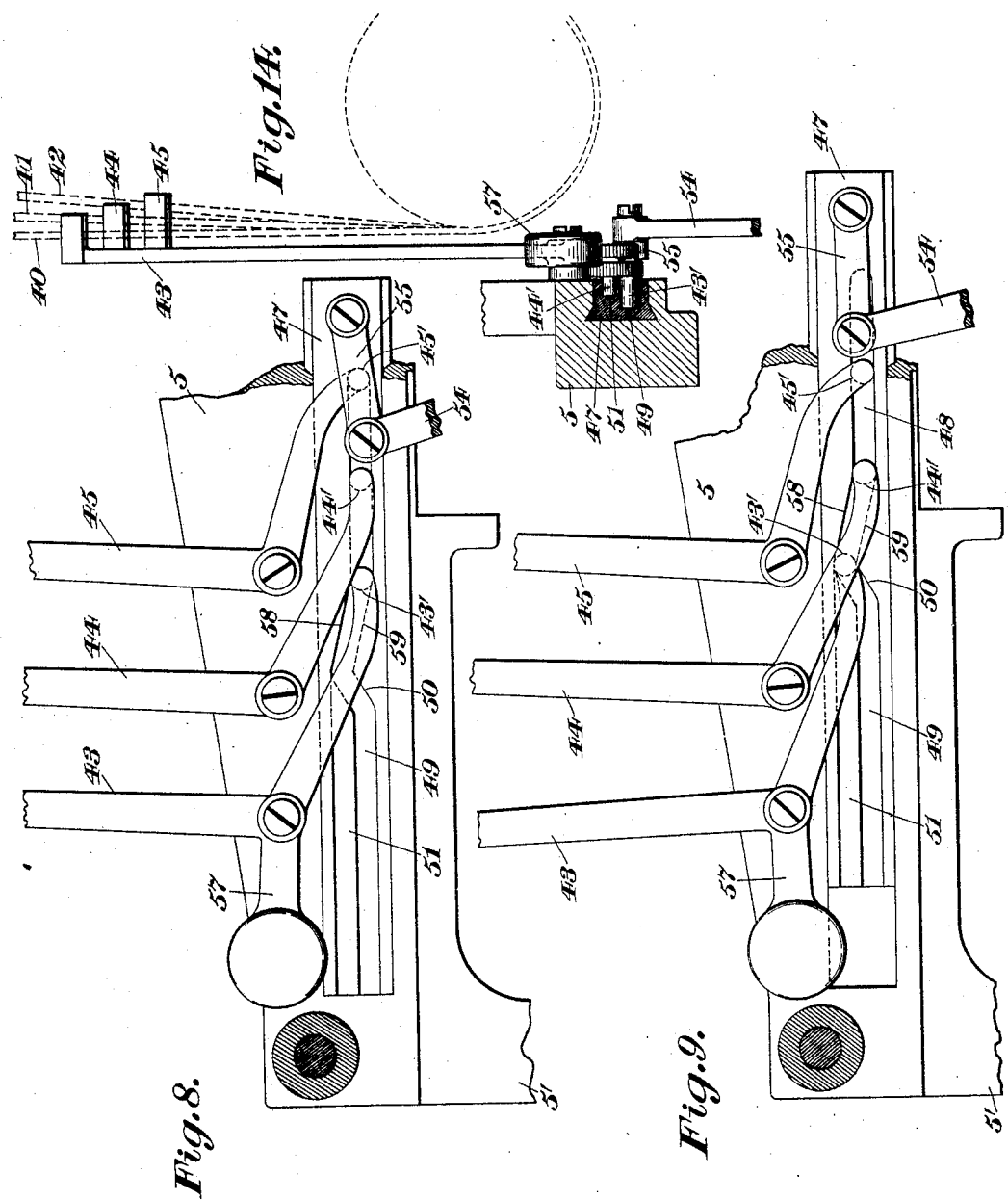
Witnesses:
Chas. D. King.
Fred. J. Dole.
Inventor:
F. H. Richards.

(No Model.)
8 Sheets—Sheet 7.
F. H. RICHARDS.
WEIGHING MACHINE.
No. 578,160.
Patented Mar. 2, 1897.
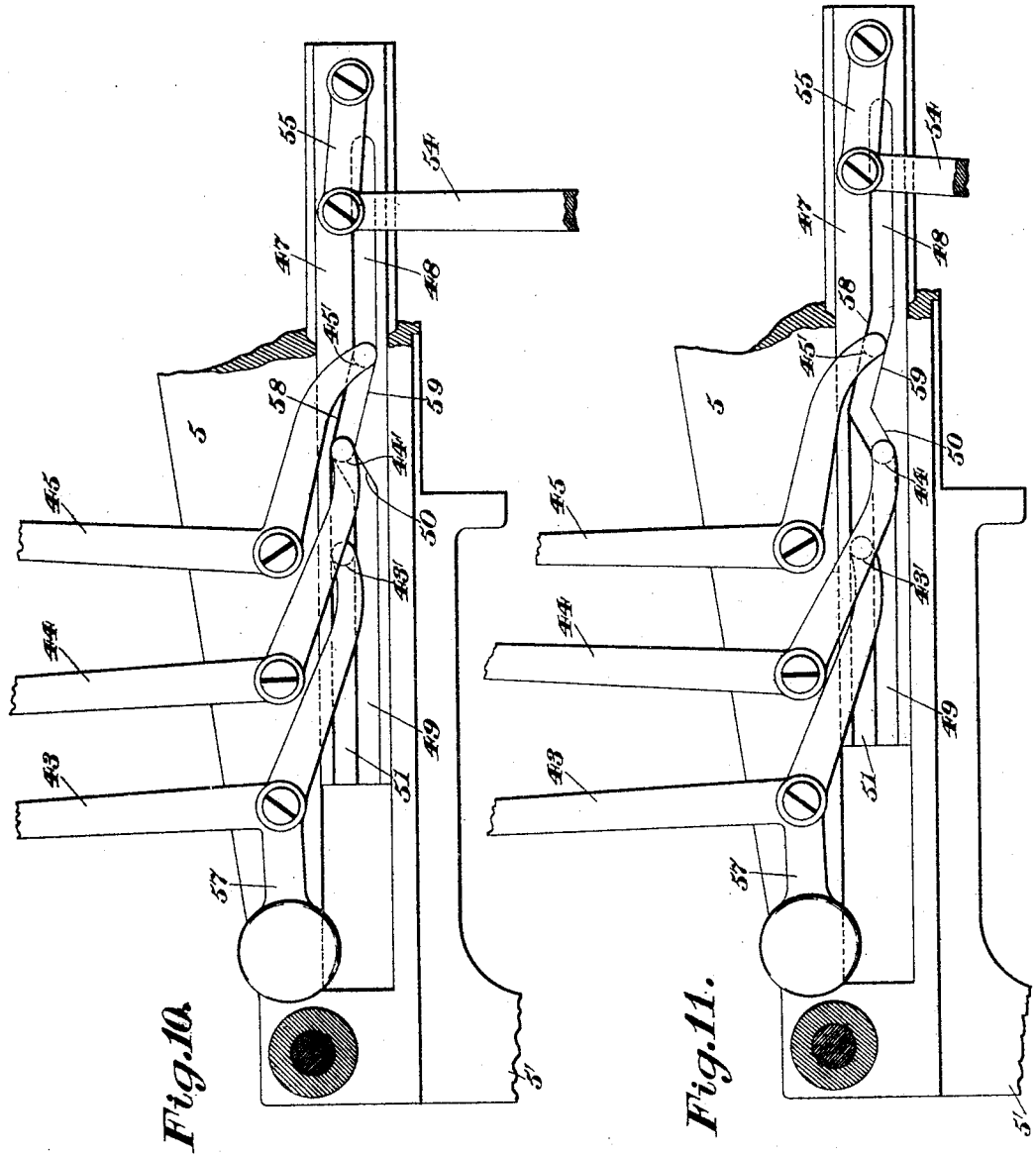
Witnesses:
Chas. D. King.
Fred. J. Dole.
Inventor:
F H Richards.

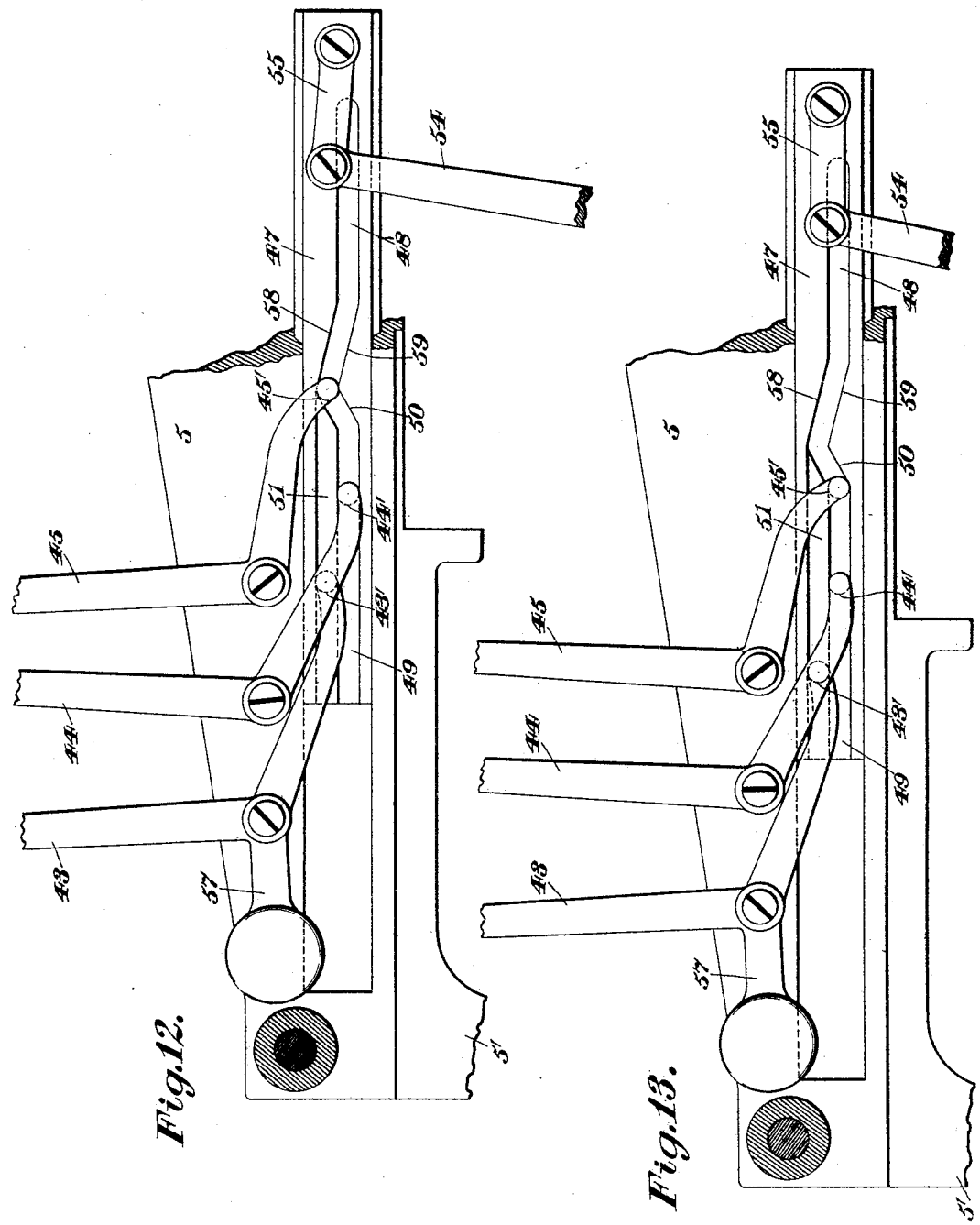

UNITED STATES PATENT OFFICE.

FRANCIS H. RICHARDS, OF HARTFORD, CONNECTICUT.

WEIGHING-MACHINE.

SPECIFICATION forming part of Letters Patent No. 578,160, dated March 2, 1897.

Application filed September 14, 1896. Serial No. 605,797. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and more especially to means for supplying the bucket thereof with material to form a load, the object being to provide an improved organization of mechanism comprehending a feeder for delivering a mass or body of material to said bucket from a suitable source of supply and driving and controlling mechanism for said feeder automatically governed by means operative with the weighing mechanism.

Figure 4:
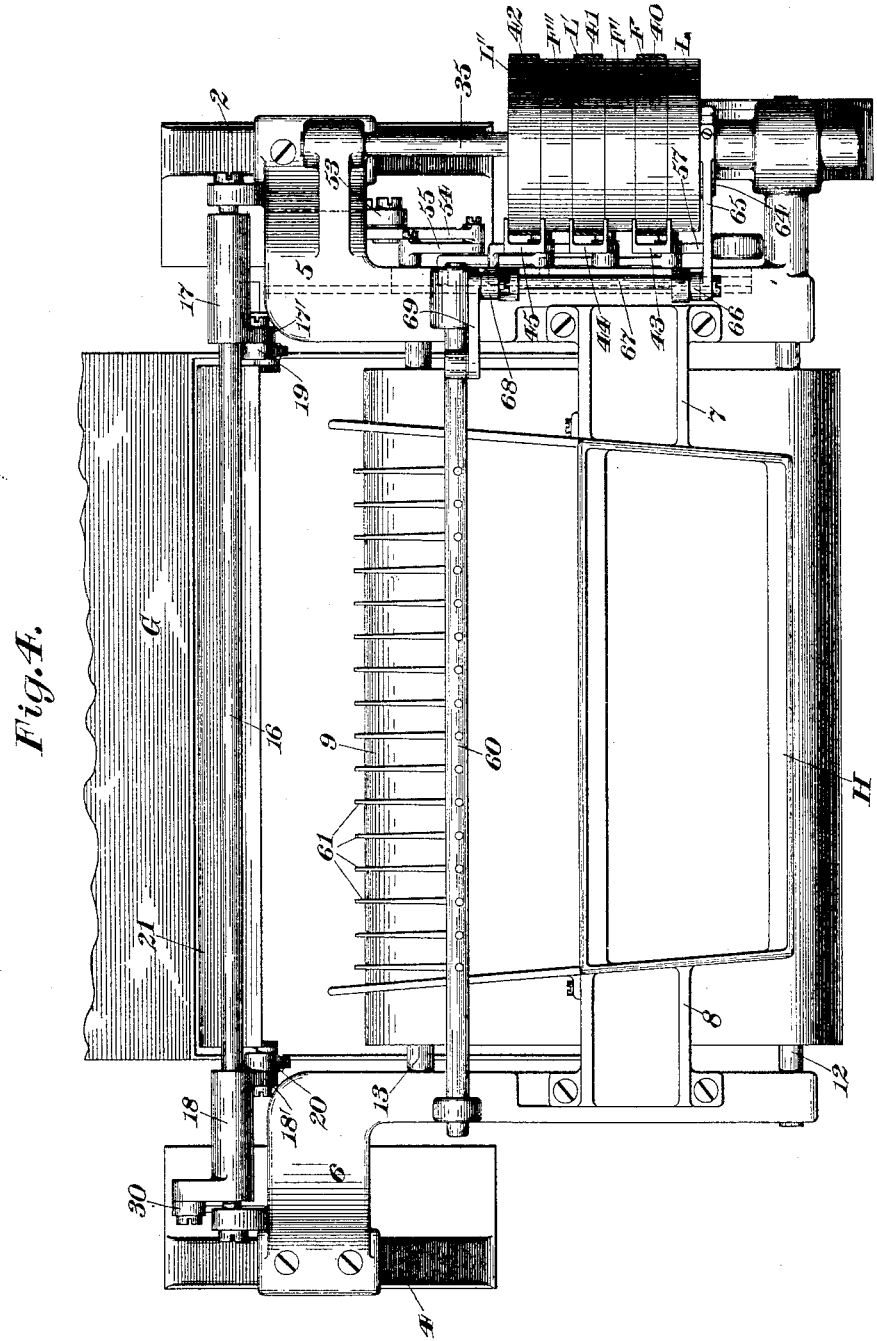
Figure 5:
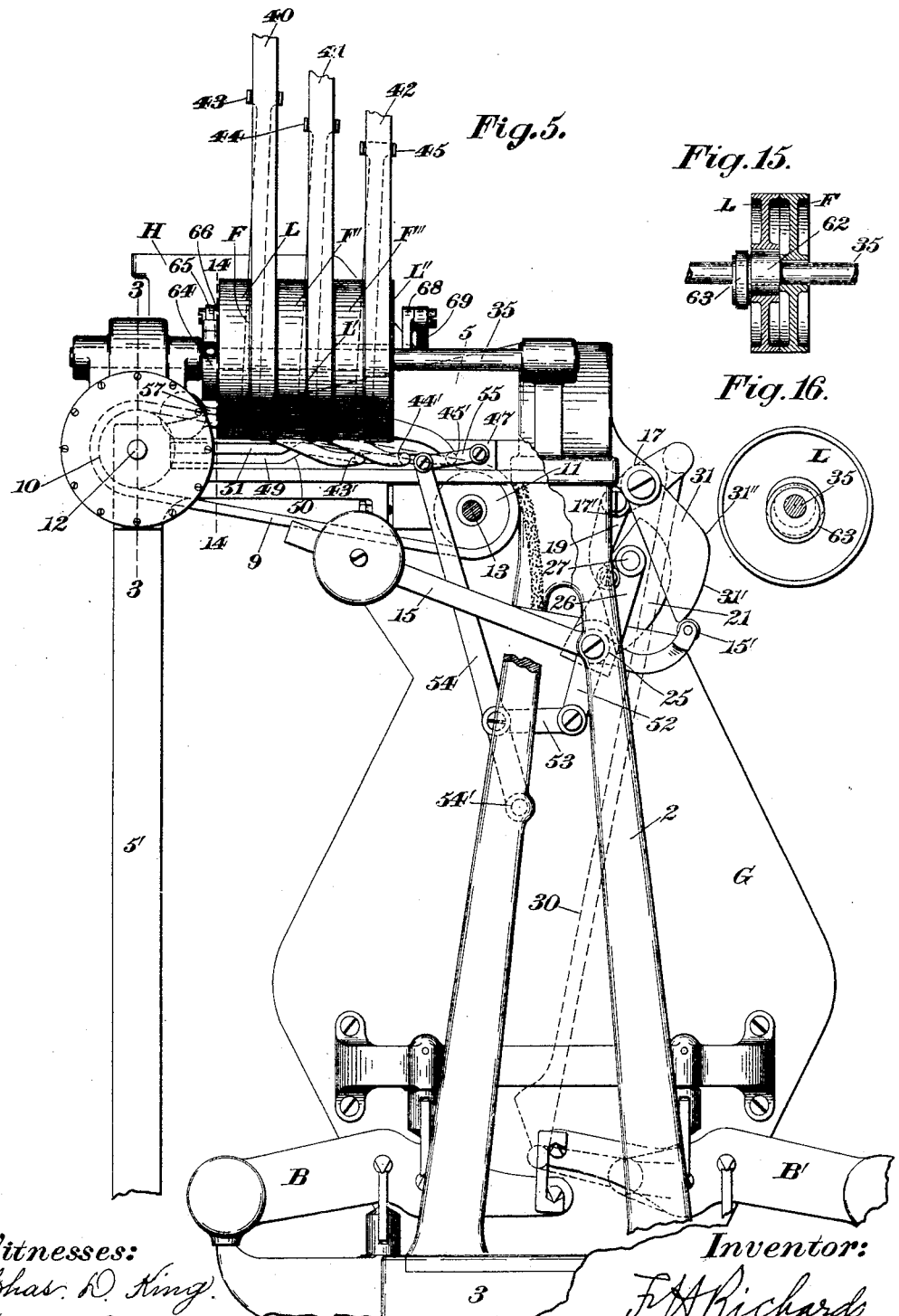
Figure 6:
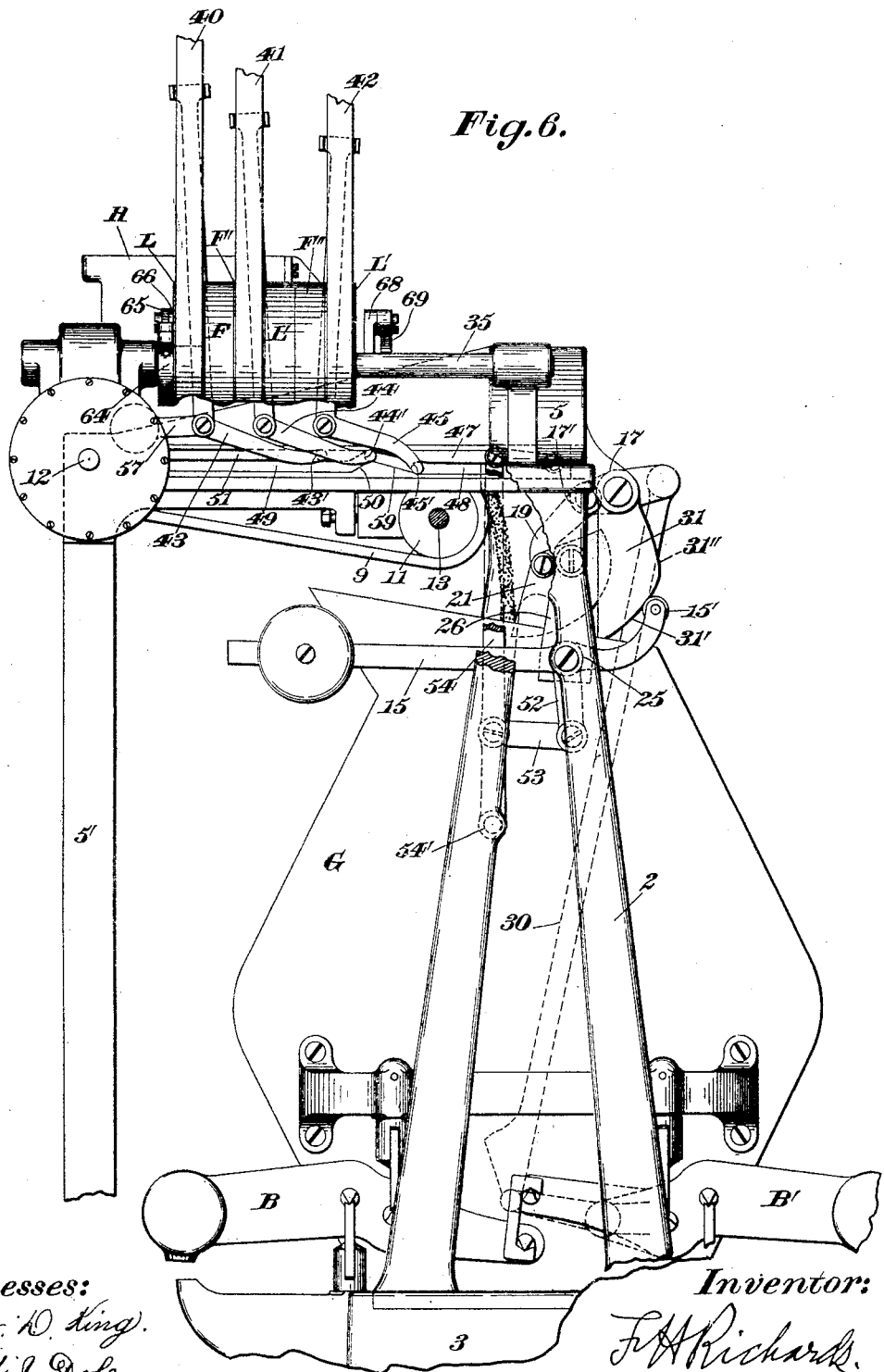
Figure 7:
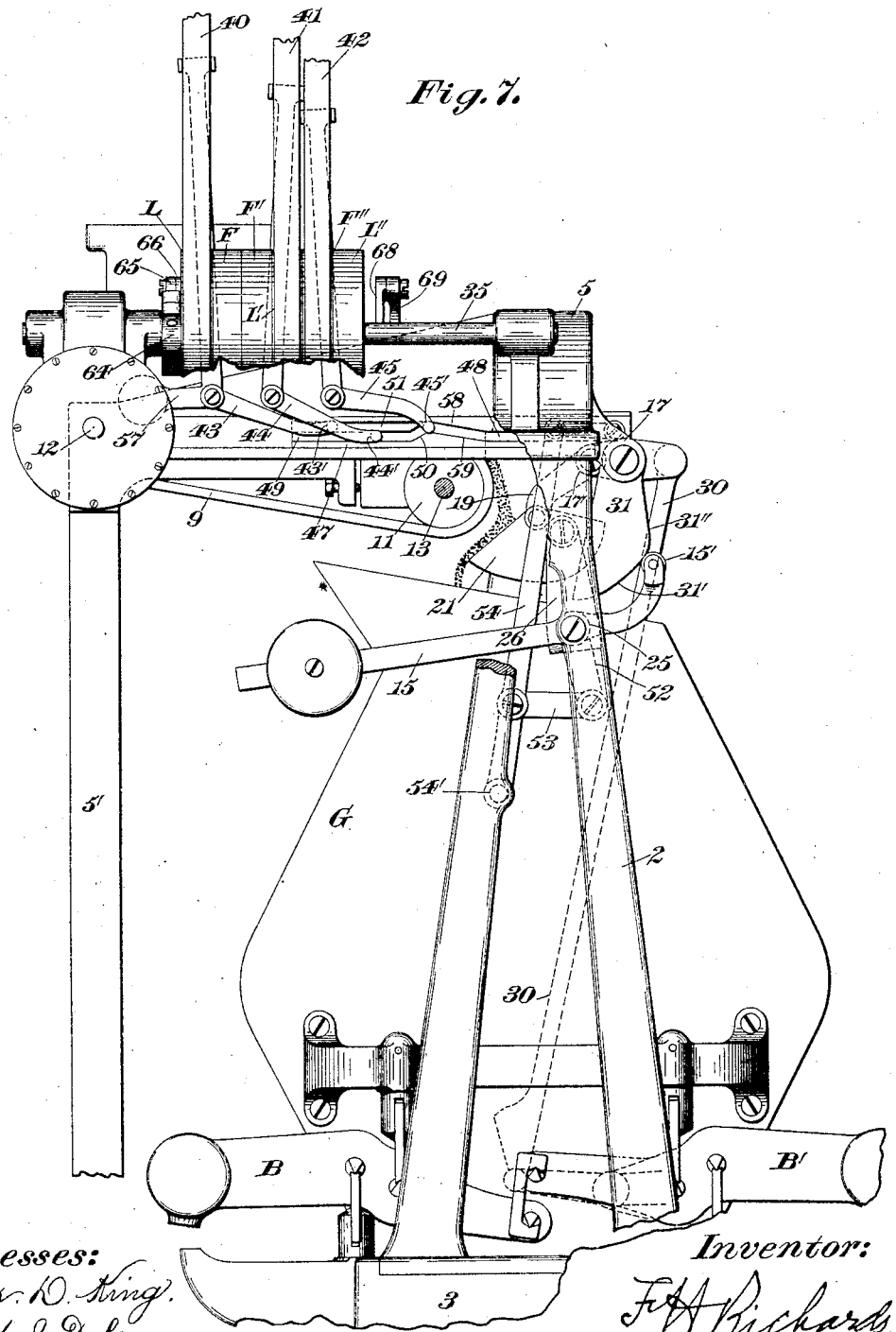

In the drawings accompanying and forming part of this specification, Figure 1 is a rear elevation of the upper part of a machine, illustrating the feeder and its driving and controlling mechanism. Fig. 2 is a detail view in elevation with parts cut away, showing a means for transmitting motion from the power-shaft of a driving mechanism to the feeder. Fig. 3 is a detail view in rear elevation, partly in section, the section being taken in line 3 3, Fig. 5, and also showing such power-transmitting means. Fig. 4 is a plan view of the upper part of the machine and its framing, and also illustrates a device for disintegrating the lumps in and for also thinning out the supply-stream. Figs. 5, 6, and 7 are end elevations of the upper parts of the machine above the base and show the positions occupied by said parts at their successive stages in the operation of the machine. Figs. 8, 9, 10, 11, 12, and 13 are detail views, on an enlarged scale, of the belt-shipping mechanism for successively shipping the driving-belts at predetermined points in the operation of the machine. Fig. 14 is a detail view, in rear elevation and partly in section, on the line 14 14, Fig. 5, of the belt-shipper, showing by dotted lines the belt and a portion of the pulley; and Figs. 15 and 16 are detail views hereinafter more particularly described.

Similar characters designate like parts in all the figures of the drawings.

My present invention includes as one of its constituent elements weighing mechanism which may be of any suitable or preferred character. For convenience in illustrating the nature and purpose of said invention I have illustrated weighing mechanism substantially similar to that disclosed in Letters Patent No. 548,840, granted to me October 29, 1895, to which reference may be had, and the principal parts of which, except such as those bearing a close relation to my present improvements, will be briefly described.

The framework in the present instance consists of a supporting base or bed 3, only a fragment of which, however, is illustrated in Figs. 5, 6, and 7, from which the end frames or columns 2 and 4 rise, said end frames being surmounted by the beams 5 and 6, substantially L-shaped in plan, and which constitute a convenient means for carrying the working parts of the supply apparatus, which latter includes the chute or hopper H, of ordinary construction, said beams being supported at the rear by the posts or standards 5' and 6'. The chute or hopper H has laterally-extending brackets 7 and 8, suitably attached, respectively, to the top beams 5 and 6 by some well-known means.

The beam mechanism consists of the counterweighted scale-beams B and B', fulcrumed on the base 3 and sustaining the bucket G in the manner disclosed in my aforesaid Letters Patent.

In the present instance and for delivering the material to the bucket G to build up the load therein I employ a positive feed device or feeder, which consists of an endless belt or apron 9, passed around the supporting rolls or drums 10 and 11, the shaft 12 of the last-mentioned of which is journaled in bearings formed in the beams 5 and 6, the shaft 13 of the other roll being carried by adjusting blocks depending from and suitably connected to said beams, whereby the tension of the belt may be properly regulated and slack taken up when necessary.

The feeder-belt 9 is located beneath the chute or hopper H, and the latter being filled and said belt being properly driven a stream or body of material will be conveyed from such chute or hopper and delivered to the bucket. The action of the feeder 9 will be controlled by means operative with the weighing mechanism, such as the valve-actuating arm 15, which is counterweighted and is pivotally connected to the end frame 2, as clearly indicated in the several end elevations of the drawings.

In the construction herein illustrated the feeder will have successive speeds of different velocities and a period of rest, it being thrown out of action temporarily to permit the discharge of the bucket-load.

Just preceding the completion of the load the feeder 9 will be driven at its minimum speed for delivering the drip-stream into the bucket for the purpose mentioned, and on the completion of the load and the simultaneous throwing out of action of said feeder it is desirable to project a valve across the line of feed of the supply-stream for catching particles of material which drop from the feeder on its stoppage, as this forms no part of the weighed charge, and for also cutting off the reduced supply-stream.

A transverse rock-shaft is shown at 16, having at the outer ends thereof the sleeves 17 and 18, in which are formed bearings for the reception of pivot-screws carried by projecting lugs on the framing of the machine. The two sleeves 17 and 18, at the inner ends thereof, have lugs or ears 17′ and 18′, to which are pivoted links 19 and 20, said links being similarly connected to the end walls of the drizzle-catching valve or cut-off 21, which in the present instance is of "pan" shape and slightly exceeds in width the feed-belt 9.

The valve-actuating lever 15 is furnished with a projection 25, (see Fig. 1,) to which is clamped the rock-arm 26, said rock-arm being loosely connected to the pin 27 on the end wall of the valve 21. The tendency of the weighted arm of the valve-actuating lever 15 is to drop, this action, however, being retarded during the weighing of a load, and when said weighted arm descends the rock-arm 26 will be swung to the left, it being assumed that the valve is in its wide-open position, as indicated in Fig. 5, so that said valve will be oscillated slowly about its axis or center of movement and in correspondence with the descent of the beam mechanism. At the commencement of the poising period, as indicated in Fig. 7, said valve will have reached the position shown in Fig. 1, suitable means at this time being employed to temporarily hold the valve to permit the feed of the drip-stream into the bucket, the valve-actuating lever 15 also being held, and on the release of said members the lever 15 will drop quickly, and in so doing an accelerated oscillatory movement will be communicated to the valve 21 by reason of its connection with said lever, the discharge edge of said valve intersecting the flow-line of the stream and thereby cutting off the same and catching the dropping particles from the feeder-belt 9.

I have mentioned the fact that the closing movement of the valve 21 will be limited or retarded during the weighing operation, and for this purpose a connection with the beam mechanism will be employed. A relatively long rod is shown at 30, pivoted to the lug or ear on the sleeve 18 and bearing against the beam mechanism. The sleeve or collar 17 is furnished with a depending cam 31, which may be formed integral therewith. The feeder-belt 9, being driven at its maximum velocity, as illustrated in Fig. 5, and the valve 21, being wide open, the supply-stream will be caused to enter the bucket, the latter, when a certain proportion of the load has been received, descending and in synchronism with the supporting-beam mechanism, and as said beam mechanism descends and falls away from the connecting-rod 30 the weighted arm of the lever 15 is free to drop, the non-counterweighted arm of said lever being furnished with a roll 15′, which travels along the acting or working face of the cam 31. The cam has two connecting-faces 31′ and 31″ of different curvatures, the first-mentioned face being of such shape as to permit a relatively slow descending movement of the weighted arm of said lever. When the roll 15′ leaves the cam-face 31′ and enters the cam-face 31″, the weighted arm of said lever will have a rapid downward movement, the shape of said last-mentioned face being preferably such as to permit such operation. On the return movement of the actuating-beam for the rod 30 an upward thrust will be imparted to said rod, and through the connection of the latter with the controlling rock-shaft 16 the operation just set forth will be reversed, whereby the respective members may be returned to their normal positions.

The shaft 12 of the rear roll of the driving mechanism is extended beyond its support and rigidly carries the worm-gear 33, with which the worm 34 on the driving or power shaft 35 is adapted to mesh, said gears being preferably incased or housed to protect them from dirt, dust, &c.

The power-shaft 35 of the feeder-driving mechanism is suitably supported by bearings on the framing of the machine and carries a series of pulleys in pairs or sets of two, each pair comprising a fast and a loose pulley, said series of pulleys being connected by belting, consisting of the belts 40, 41, and 42, to a cone pulley or pulleys of differential diameters rigidly mounted on a line or other shaft. Said cone-pulley and line-shaft, forming no part of my present invention, are not illustrated.

The three fast pulleys are designated by F, F′, and F″, respectively, and the loose pulleys by L, L′, and L″, the driving-belt 40 being shiftable from the fast pulley F to the loose pulley L, and vice versa, and the same with respect to the belt 41 and pulleys F′ and L′ and the belt 42 and the pulleys F″ and L″.

The three belts 40, 41, and 42, which are successively shiftable by independently-operating belt-shippers, will be respectively connected or passed around the large, medium, and small sized pulleys, to which I have previously referred, so that when the belt 40 is on the fast pulley F, the belts 41 and 42 being at this time on the loose pulleys L' and L'', the feeder-belt 9 will be driven at its maximum velocity for conveying a stream of large volume into the bucket G.

When the belt 40 is shipped from the fast pulley F to the loose pulley L and the belt 41 has been slipped from the loose pulley L' to the fast pulley F', the speed of the feeder will be decreased, as will be understood, the speed of the feeder being further reduced by the shipment of the belt 42 from the loose pulley L'' to the fast pulley F''.

For shipping the belts I have illustrated a series of levers 43, 44, and 45 of angular form, pivotally supported by the top beam 5, the upright arms of said belt-shipping levers being furnished with suitable belt-engaging means, such as the ordinary belt-engaging fingers, between which said belts are adapted to travel, the first-mentioned shipper of the series being self-operative, it being furnished with a rearwardly-extending counterweighted arm 57, formed integral therewith for effecting a belt-shipping movement thereof.

As a means for modifying or checking the movement of the self-active belt-shipper 43 for also operating and governing the action of the other two levers 44 and 45 of the series I have illustrated a recessed or channeled cam-block 47 of dovetail shape set in a correspondingly-formed guideway or mortise in the framing of the machine for longitudinal movement, said block being reciprocated back and forth by connections with the valve-actuating lever 15, the working surface of said recess being of different pitches. The longitudinal recess of the block 47 is designated by 48 and is relatively deep, it being widened out at 49 or to the left of the angular cam 50, the active face of which latter forms a part of the lower wall of said slot. (See Figs. 8 to 11.) The block 47 has also located within its recess 48 the projecting shoulder 51. The lower arms of the belt-shipping levers 43, 44, and 45 are furnished with projecting studs or pins 43', 44', and 45', of different lengths, the first-mentioned being relatively longer than the others.

The projection 25 of the valve-actuating lever 15 is provided with the depending rock-arm 52, to which is pivoted the link 53, said link being similarly attached to the lever 54, which is pivoted at 54' to the end frame of the machine, as illustrated in the several end elevations. The lever 54 is operatively connected to the sliding block 47 by the interposed link 55. The reciprocating block 47 being at the limit of its rearward movement, as indicated in Figs. 5 and 8, the valve 21 will be wide open and the driving-belt 40 will be on the fast pulley F, so that the feeder-belt 9 will be driven at its maximum velocity for conveying a stream of large volume from the chute H and for also delivering it to the bucket G. When a certain part of the predetermined charge has been received by the bucket, it and the beam mechanism will descend, and the latter falling away from the connecting-rod 30 will permit the closure of the valve by the dropping of the weighted arm of the valve-actuating lever 15, and as said arm drops the rock-arm 52 will be oscillated to the right, the movement of the block 47 in a corresponding direction being effected by reason of its connections with said rock-arm and being also in correspondence with the action of the weighing mechanism at this time. As the block 47 moves in the direction indicated the projection 43' on the lower arm of the belt-shipping lever 43, it being between the walls of the longitudinal recess 48, which is of cam formation, will be guided upward and the thrusting of the upright arm of the belt-shipping lever 43 to the left by the counterweighted arm 57 of said lever will be limited, as will be obvious. When the projection 43' leaves the longitudinal oblique portion 58 of the recess 48, it will engage the upper face of the said recess, the belt 40 at this time having been shipped from the fast pulley F to the loose pulley L. Just previous to this operation the projection 44' of the lever 44 will have come opposite the base of the angular cam 59, so that as the block 47 continues its movement said projection will be caused to travel along and up the longitudinal inclined face of said cam, thereby elevating the lower arm of the belt-shipping lever 44 and oscillating the upright arm thereof to the left, whereby at about the time the driving-belt 40 has been shipped the belt 41 will be slipped from the loose pulley L' to the fast pulley F', as indicated in Fig. 6, at which point the feeder-belt 9 will be driven at its medium speed. On the continued movement of the block 47 the projection 44' will reach the apex of the cam 59 and will travel down the short oblique face of said cam, said pin also being in engagement with the lower face of the shoulder 51, which forms a complemental part of the cam recess and is of such shape as to effect an accelerated movement to the lever 44 for quickly returning the belt 41 to the loose pulley L'. Continuing its movement the block 47 will operate the shipper 45 in a manner similar to the lever 44 for slipping the belt 42 from the loose pulley L'' to the fast pulley F'', to drive the feeder-belt 9 at its minimum speed, and back again, whereby the feeder-belt on such last-mentioned action will be entirely stopped, the three belts at this stage being on the loose pulleys, the projections or pins 44' and 45' being between the lower faces of the shoulder 51 and the recess 48, and the projection 42' being against the upper face of said recess, as indicated in Fig. 13, whereby the respective belts will be positively held on the loose pulleys of the series. On the return movement of the block 47 the action just described will be reversed.

In connection with the supply apparatus I employ a disintegrating device which is in the form of a reciprocatory bar 60, supported by suitable brackets on the framing of the machine and having a series of projecting fingers 61, which are adapted to come in contact with the mass of material on the feed-belt 9, so that when the bar is reciprocated transversely of the line of feed, lumps of material in the mass will be broken up and the supply-stream will be thinned out, whereby the material may be delivered in an even stream for uniformly filling the bucket G.

The transversely-reciprocatory bar 60 will be operated, preferably, while the feeder-belt 9 is being driven at its medium and slow speeds and by means connected to the first loose pulley L of the series—that is to say, when the driving-belt 40 is shipped from the fast pulley F to the loose pulley L, said reciprocatory bar will be concurrently started.

On reference to the detail views Figs. 15 and 16, a sleeve or collar is shown at 62, it being loosely supported on the shaft 35, said sleeve also being keyed within the hub of the loose pulley F. Said sleeve has formed thereon the eccentric projection 63, which is embraced by the ring or strap 64 of the connecting-rod 65, the latter being pivoted to a depending arm 66 on the short rock-shaft 67, which is supported by brackets on the top beam 6 of the machine. The rock-shaft 67 has a second arm 68 at its opposite end, which is connected by the link 69 to a lug on the bar 60, so that when the driving-belt 40 is shipped from the fast pulley F to the loose pulley L the bar 60 will be reciprocated back and forth by reason of its operative connections with said pulley, as will be apparent, whereby the fingers 61 of said bar will break up the lumps in the supply.

The operation of the hereinbefore-described machine briefly is as follows: Fig. 5 represents the positions occupied by the parts at the commencement of operation, the valve 21 being in its wide-open position and the driving-belt 40 being on the fast pulley F and the belts 41 and 42 being on the loose pulleys L' and L", so that the feeder-belt 9 will be driven at its maximum velocity or highest speed for conveying a stream of material from the chute or hopper H and for delivering it to the bucket G, the latter being empty. When a certain proportion of the load to be weighed has been received by the bucket, the bucket and the beam mechanism will descend and the latter, falling away from the connecting-rod 30, will permit the closure of the valve 21 by the slow dropping of the weighted arm of the actuating-lever 15, which is connected to said valve, the reciprocating block 47 being moved to the right and being properly limited by the weighing mechanism.

At predetermined points in the forward movement of the block 47 the belt-shippers 43, 44, and 45 will be successively operated by said block, for shipping the belt 40 from the fast pulley F to the loose pulley L and the belt 41 from the loose pulley L' to the fast pulley F' and back again and the belt 42 from the loose pulley L" to the fast pulley F" and back again, at which time the three belts will be on the loose pulleys of the series and the motion of the feeder will be stopped.

Having described my invention, I claim—

1. The combination with a shaft carrying fast and loose pulleys; of a belt shiftable from one of said pulleys to the other, and vice versa; a belt-shipper having a projection; and a reciprocatory block having a recess of different depths in which said projection is located.

2. The combination with a shaft carrying a series of fast and loose pulleys; of a series of belts shiftable, respectively, from the fast to the loose pulleys, and vice versa; a reciprocatory block having a recess of different depths; and a series of belt-shippers having projections of different lengths located in said recess.

3. The combination with a shaft carrying a series of fast and loose pulleys; of a series of belts shiftable, respectively, from the fast to the loose pulleys, and vice versa; a reciprocatory block having a cam-recess of different depths; and a series of belt-shippers having projections of different lengths located in said recess.

4. The combination with a shaft having a series of fast and loose pulleys; of a series of belts shiftable, respectively, from the fast to the loose pulleys, and vice versa; a reciprocatory block having a recess of different depths; and a series of belt-shipping levers having projections of different depths located in said recess, one of said levers being counterweighted.

5. The combination with weighing mechanism including a bucket, of a feeder and its driving mechanism comprehending a shaft carrying fast and loose pulleys; a belt shiftable from one of said pulleys to the other, and vice versa; a belt-shipper having a projection; a reciprocatory block having a recess of different depths in which said projection is located, said block being operative with, and controlled by, the weighing mechanism.

6. The combination with weighing mechanism including a bucket, of a feeder and its driving mechanism comprehending fast and loose pulleys; a driving-belt; a self-active belt-shipper having a projection; and a reciprocatory block having a recess of different depths in which said projection is located, said block being operative with, and controlled by, the weighing mechanism.

7. The combination with weighing mechanism including a bucket, of a feeder and its driving mechanism comprehending a shaft provided with a series of fast and loose pulleys; a series of belts normally carried by the loose pulleys; and belt-shipping means controlled by the weighing mechanism, for successively shipping said belts from the loose pulleys to the fast pulleys and for returning the same to their normal positions during the weighing of a load.

8. The combination with weighing mechanism, of a feeder and its driving mechanism including a series of fast and loose pulleys; a series of driving-belts; independently-operative belt-shippers, each of which has a projection; a cam-recessed reciprocatory block adapted to receive said projection to effect the successive operation of said belt-shipper; and means controlled by the weighing mechanism for reciprocating said block.

9. The combination with weighing mechanism and with a feeder and its driving mechanism including fast and loose pulleys, of a belt; a belt-shipper consisting of a counterweighted pivotally-mounted lever, one of the arms of which has a projection; a recessed reciprocatory block in the recess of which said projection is located; and means controlled by the weighing mechanism, for reciprocating said block.

10. The combination with weighing mechanism including a bucket, of a feeder and its driving mechanism comprehending a shaft carrying fast and loose pulleys; a driving-belt; a belt-shipping lever having a projection; a reciprocatory block having a cam-recess, the working face of which is of different pitches, and which is adapted to receive the projection of said belt-shipping lever; and means operative with the weighing mechanism, for actuating said block.

11. The combination with weighing mechanism embodying a bucket, of a feeder and its driving mechanism including fast and loose pulleys; a belt; a belt-shipping lever having a projection; a valve; an operating device for said valve; and a reciprocatory block having a recess of different depths adapted to receive said projection, said block being also connected to the valve-actuating device, whereby it will be reciprocated by said device.

12. The combination with weighing mechanism embodying a bucket, of a feeder and its driving mechanism including fast and loose pulleys; a belt; a belt-shipper having a projection; a valve having an operating-lever connected thereto; and a reciprocatory block having a recess adapted to receive said projection, said block being also operatively connected to said lever.

13. The combination with weighing mechanism embodying a bucket, of a feeder and its driving mechanism including fast and loose pulleys; a belt; a belt-shipper having a projection; a valve; an operating-lever for said valve having a projection to which is connected a rock-arm pivoted to the valve; a second rock-arm on said projection; a lever connected to said second rock-arm; and a reciprocatory block having a recess adapted to receive the projection of said belt-shipper and operatively connected to said last-mentioned lever.

14. The combination with framework and with weighing mechanism embodying a bucket, of a feeder and its driving mechanism including fast and loose pulleys; a belt; a belt-shipper having a projection; a valve; an operating-lever for the valve, mounted on the framework and having a rock-arm connected to a projection on said lever, said rock-arm being pivoted to the valve; a second rock-arm on the projection of said lever; a lever mounted on the framework of the machine and connected by a link to said last-mentioned rock-arm; and a reciprocatory block having a recess adapted to receive the projection on said belt-shipper and connected by a link to said last-mentioned lever.

15. The combination with weighing mechanism embodying a bucket, of a feeder and its driving mechanism including fast and loose pulleys; a belt; a belt-shipper having a projection; a rock-shaft having a valve connected thereto; a cam depending from said shaft; an operating-lever for said valve adapted to engage said cam; and a reciprocatory block having a recess adapted to receive said projection and operatively connected to the valve-operating lever.

16. The combination with weighing mechanism including a bucket, of a feeder and its driving mechanism including fast and loose pulleys; a belt shiftable from one of said pulleys to the other, and vice versa; an eccentric attached to the fast pulley, a strap on said eccentric, having a rod; a reciprocatory bar provided with fingers adapted to come in contact with the mass of material on the feeder; operative connections between said bar and eccentric-rod; a reciprocatory block having a recess of different depths; a counterweighted belt-shipper having a projection adapted to travel in said recess; and means operative with the weighing mechanism, for reciprocating said block.

17. The combination with weighing mechanism embodying a bucket, and with a feeder; of driving mechanism for said feeder, including fast and loose pulleys; a belt; a belt-shipper having a projection; an eccentric attached to one of said pulleys; a strap on said eccentric having a rod; a reciprocatory bar having projecting fingers adapted to come in contact with the mass on the feeder; operative connections between said bar and eccentric-rod; and a reciprocatory block controlled by the weighing mechanism and having a recess adapted to receive the projection on the belt-shipper.

18. The combination with weighing mechanism embodying a bucket, of a feeder and its driving mechanism including fast and loose pulleys; a belt; a belt-shipper having a projection; a reciprocatory block controlled by the weighing mechanism and having a recess adapted to receive said projection; an eccentric on one of said pulleys; a strap on said eccentric having a rod; a bar having projecting fingers adapted to come in contact with the material of the feeder; and a rock-shaft operatively connected, respectively, to said bar and eccentric-rod.

19. The combination with weighing mechanism embodying a bucket, of a feeder and its driving mechanism including a series of fast and loose pulleys; belts shiftable from the fast to the loose pulleys, and vice versa, during the weighing of a load; a series of belt-shipping levers having projections, one of which projections is longer than the others, and one of said levers being counterweighted; a reciprocatory block having a recess of different depths adapted to receive said projections; and means operative with the weighing mechanism, for imparting a stroke in one direction to said block during the weighing of a load.

FRANCIS H. RICHARDS.

Witnesses:
 FRED. J. DOLE,
 F. N. CHASE.